No. 788,668. PATENTED MAY 2, 1905.
C. T. McCUE.
SPRING CONNECTION FOR VEHICLES.
APPLICATION FILED JAN. 16, 1904.

WITNESSES:
W. F. Doyle.
Leona O. Smith.

INVENTOR
Charles T. McCue.
BY
Jenkins & Barker,
Attorneys.

No. 788,668. Patented May 2, 1905.

UNITED STATES PATENT OFFICE.

CHARLES T. McCUE, OF HARTFORD, CONNECTICUT.

SPRING CONNECTION FOR VEHICLES.

SPECIFICATION forming part of Letters Patent No. 788,668, dated May 2, 1905.

Application filed January 16, 1904. Serial No. 189,258.

*To all whom it may concern:*

Be it known that I, CHARLES T. McCUE, a citizen of the United States, and a resident of Hartford, in the county of Hartford and State of Connecticut, have invented a new and Improved Connection for Springs for Vehicles, of which the following is a specification.

My invention relates to the class of devices for connecting the ends of the springs commonly used and located between the running-gear and the body of a vehicle; and the object of my invention is to provide a durable efficient connection and one that shall be neat and sightly in appearance. The form of device in which this object may be attained is illustrated in the accompanying drawings, in which—

Figure 1:
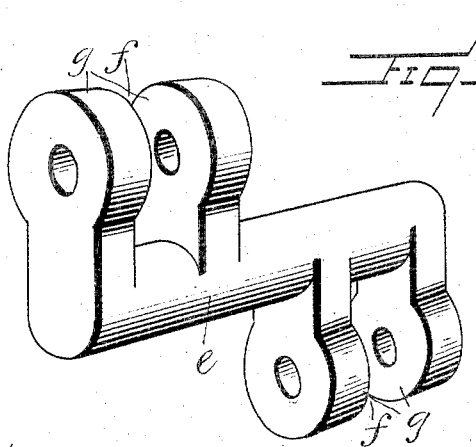
Figure 2:
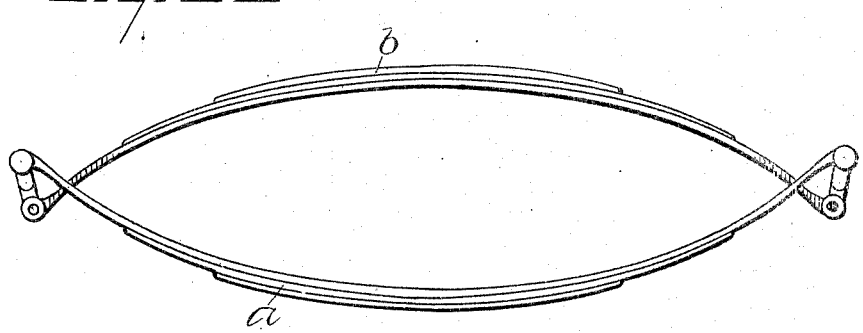
Figure 3:
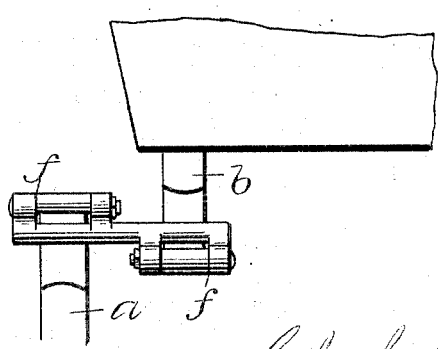

Figure 1 is a perspective view of my improved connection. Fig. 2 is a view in front elevation of a spring the ends of which are joined by the use of my improved connection. Fig. 3 shows the device as applied in use.

In the accompanying drawings the letter $a$ denotes a lower spring member arranged to be secured to the axle of a wagon, carriage, or like vehicle.

The letter $b$ denotes the upper spring member arranged to be secured to the vehicle-body, the two members disposed side by side and the ends of each spring extending past the other spring. The ends are connected in a manner to allow each spring free and independent play to the greatest extent.

My invention relates particularly to means for joining the ends of two spring members in a manner to allow each member to be constructed without any lateral bend or curve, each spring member being located entirely outside the plane of the opposite member.

Prior to my invention straps have been employed, a strap being secured to and located on each side of the end of one spring and also on the end of the opposite spring to be attached thereto.

By the use of my improved connection certain objections found in the use of prior connections are avoided.

In carrying out my invention I provide a cross-piece $e$, preferably formed of metal cast or wrought to shape, and at each end of this cross-piece and as shown in the drawings recesses $f$ are formed, located, preferably, on opposite sides of the cross-piece. Ears $g$ extend from the cross-piece to form the recesses $f$, and suitable openings are formed in the ears for the reception of the bolt or pin which passes through said ears and the end of the spring to be united to the connection. It is obvious that the relative location of the ears and recesses herein shown and described may be varied to a considerable extent without departing from the invention and that they may be variously arranged to permit any desired form of connection of the ends of the spring one to the other.

The form of connection herein shown and described provides an extremely strong and durable connection and one that allows full freedom to the springs to act, and the device is extremely neat in appearance, which is a very desirable feature in wagon or carriage construction at the present time, as purchasers are extremely particular that the vehicle, and especially the running-gear, shall present a neat, light, and sightly appearance. My invention has all of these features and at the same time is durable, strong, and efficient.

What I claim as my invention, and desire to secure by Letters Patent, is—

1. In combination in a spring including members to be united at their ends, a connection including a cross-piece with recesses formed on opposite sides thereof and opening in opposite directions for the reception of the ends of the spring members whereby the latter cross each other near their ends, but at a point removed from the cross-piece, and means for securing the ends of the springs in said recesses.

2. In combination in a spring including two members to be united at their ends, a connection including a cross-piece with recesses on opposite sides at the ends of the cross-piece and opening in opposite directions for the reception of said springs whereby the latter cross each other near their ends, but at points removed from the cross-piece, and means for securing the ends of the springs in said recesses.

CHARLES T. McCUE.

Witnesses:
ARTHUR B. JENKINS,
CORA M. ATWOOD.